United States Patent [19]

Mullersman

[11] 4,424,476

[45] Jan. 3, 1984

[54] CONTROLLED FAST CHARGER

[75] Inventor: Ferdinand H. Mullersman, Gainsville, Fla.

[73] Assignee: General Electric Company, Gainesville, Fla.

[21] Appl. No.: 225,609

[22] Filed: Jan. 16, 1981

[51] Int. Cl.³ .............................................. H02J 7/10
[52] U.S. Cl. ...................................................... 320/36
[58] Field of Search .................................... 320/35, 36

[56] References Cited

U.S. PATENT DOCUMENTS

| | | | |
|---|---|---|---|
| 3,534,241 | 10/1970 | Wilson et al. | 320/35 X |
| 3,917,990 | 11/1975 | Sherman, Jr. | 320/35 |
| 4,125,802 | 11/1978 | Godard | 320/35 |

OTHER PUBLICATIONS

*New Monolithic Ic's Simplify Charging Batteries*, Robert C. Dobkin, "Wescon/79 Conference Record", Aug. 1979, pp. 1–3.

*Primary Examiner*—William M. Shoop
*Attorney, Agent, or Firm*—Henry J. Policinski

[57] ABSTRACT

A charger supplies a battery of sealed electrochemical cells with fast rate charging current in a controlled manner. A controllable circuit element is connected between the charge current source and the battery. This element is caused to modulate the charge current in a manner so as to initially fast charge the sealed battery, but to limit its subsequent rise in temperature above the ambient to a predetermined small differential and to maintain that differential. This temperature rise limit brings about a reduction of charge rate as the battery approaches the full charged condition resulting in an acceptable current level for long term overcharge operation.

7 Claims, 3 Drawing Figures

CONTROLLED FAST CHARGER

BACKGROUND OF THE INVENTION

This invention relates to a simple, inexpensive controlled fast-rate battery charger. More particularly, it relates to a charging apparatus having the capability of initiating and controlling fast charging of a sealed secondary cell in response to the temperature of the cell being charged.

An increasing number of consumer products are operated by one or more rechargeable sealed cells, such as nickel-cadmium cells. These cells are available in many different physical sizes with various electrical charging characteristics. Typical nickel-cadmium cells are capable of being charged at a very fast rate.

If the cell characteristics are known, and the state of charge of the cell is known, a timed charge of extremely fast rate can be safely put into the cell without risk of permanent cell damage. Even if the state of charge is not known, it is still possible to safely and reliably inject a significant amount of charge (less than in the known discharged state) at a fast rate.

The timed fast-rate charge can be applied as an exclusive charge method or can be followed with a slow-rate charge. In the timed approach, a constant-current charging source of appropriate output is connected to the cell through a timed switch. Conventional chargers utilize mechanical, thermal, electrical, or even chemical timing methods to control the duration of the fast-rate charging current. Once the timer is actuated, the fast-rate charging current is fed to the cell for a predetermined time, and then interrupted. For example, a completely discharged 1.0 ampere-hour cell in a given application may be fast-charged safely at its 5C rate, 5.0 amperes, for up to 10 minutes before the timer cuts off its fast charge. The timed-only charge system works best when, in normal use, the device presents an essentially discharged cell to the charger. Under such conditions, the time and rate can be selected to provide a charge which will utilize a significantly high percentage of the cell capacity.

Where the charger application presents a high probability that partially-charged or even fully-charged, cells will be connected to the charger, then the fast-rate charge input (product of current and time) must be reduced to a value which the cell can safely withstand.

An optimal charging apparatus for providing a controlled fast-rate charging current should have several basic capabilities. First, the apparatus should be versatile and reliable. It should be able to initiate controlled fast charging of a sealed rechargeable battery independently of the initial temperature of the battery. Second, the apparatus should be immune to electrical noise. And finally, the device should be simple and cost effective. The chargers heretofore used fail in meeting one or more of these objectives.

One method for controlling fast charging of sealed rechargeable cells, is to terminate the fast-rate charging current when the battery temperature as a result of overcharging at the fast rate, rises by some predetermined increment above room (ambient) temperature. Thereupon, the fast charge rate is shifted and latched to a slow charge rate tolerable for continuous overcharge. Latching to the slow charge rate condition precludes reinitiation of the fast-rate when the battery temperature falls back toward the ambient temperature. This approach has been generally referred to as ΔTCO designating incremental temperature cutoff, and is predicated on the property of sealed cells generating heat in overcharge, resulting in a rise in temperature of the battery.

The ΔTCO latching system has been found to have several limitations and drawbacks. In particular, when a battery having a temperature greater than the ambient by more than the cutoff increment is connected to the charger, the charger will immediately latch into the slow charge rate state. This means that the user must wait until the battery temperature has dropped below the cutoff increment in order to initiate fast charging. It also may require a series of attempts because the user has no way of knowing the battery temperature in relation to the ambient temperature. This limitation may be ameliorated by adding logic circuitry which remembers that the battery has not seen fast-rate charge current when the battery temperature drops below the cutoff increment and initiates fast-rate charging at that time. However, the additional circuitry required to implement this approach tends to result in greater circuit complexity, decreased reliability and increased cost. Also, because this type of system latches into the slow charge rate state, it is susceptible to having an electrical noise spike prematurely shift its operation to the slow charge rate. Therefore, noise filtering circuits are required to achieve high reliability, and these, too, add to the complexity and cost.

In one type of conventional latching system a temperature-sensing thermistor in the battery package develops a voltage that is applied to a current control circuit. At a predetermined battery temperature, the current control circuit acts to open a series-connected switch and latch the charger to a slow charge rate. Notwithstanding the advantages of this approach, it has a tendency to be latched into the slow charge rate state when the battery is connected. To avoid this drawback a reset capability, such as a push button switch, is required to enable the battery to initially receive fast charging current and thereafter proceed through the fast to slow-rate charging sequence.

It is a general object of the present invention to provide a controlled fast charger which is not accompanied by the limitations and drawbacks associated with conventional timed fast chargers, and which has attributes more nearly approaching those of the optimal charger.

It is a particular object of the invention to provide a controlled fast charger of automatically initiating fast charging independent of the initial temperature of the battery.

It is a further object of the invention to provide a simple, low-cost charger for providing a controlled fast-rate charging mode.

Other objects will be apparent in the following detailed description and the practice of the invention.

SUMMARY OF THE INVENTION

The foregoing and other objects and advantages are achieved by the present invention, which supplies a controlled charging current to a sealed rechargeable cell and comprises: means connectable to an external electrical source for providing charging current; controllable switching means connected in series between said charging current means and said rechargeable cell and being operable between a conducting state, wherein said charging current is supplied to said cell, and a non-conducting state wherein said charging current is interrupted; thermal sensing means including first means in thermal proximity to said rechargeable cell for sensing the temperture of said rechargeable cell, and second means for sensing the ambient temperature; and switching control means responsive to said thermal sensing means for maintaining said switching means in the conducting state, and thereby providing a path for the delivery of said charging current to said rechargeable cell, until the cell temperature exceeds the ambient temperture by a predetermined amount and thereafter maintaining that temperature difference.

DESCRIPTION OF THE PREFERRED EMBODIMENT

Figure 1:
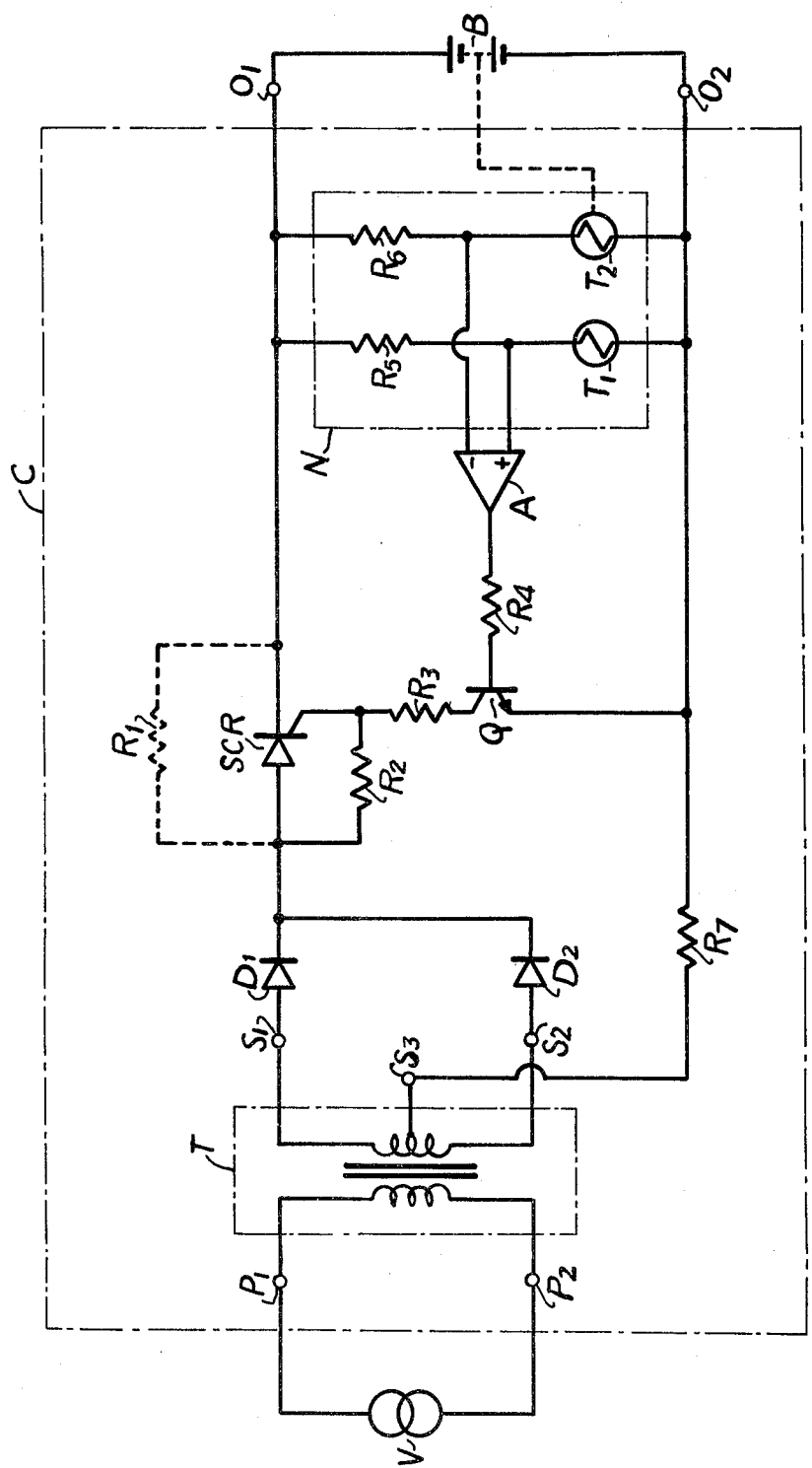
FIG. 1 is a schematic diagram of the preferred embodiment of a controlled fast charger, incorporating the present invention.

As shown in FIG. 1, the controlled fast charger comprises the elements designated by the letter C and is operative to supply a controlled charging current to a rechargeable battery B connected between positive battery terminal $O_1$ and negative battery terminal $O_2$. As indicated, the battery B may be comprised of one or more series-connected rechargeable cells.

The charger C is connectable to an external source of AC power V. Primary input terminals $P_1$ and $P_2$ of voltage transformer T connect to the power source V. The transformer secondary center tap output terminal $S_3$ is connected to the negative battery terminal $O_2$ via fast charge current limiting resistor $R_7$. The transformer secondary output terminals $S_1,S_2$ are each connected to the anode of a respective rectifier diode $D_1,D_2$ of a full-wave rectifier circuit to provide pulsed unidirectional rectified charging current. An electronic switch consisting of a silicon controlled rectifier (SCR) is connected in series between the common cathodes of rectifier diodes $D_1$ and $D_2$ and positive battery terminal $O_1$. When the SCR is conducting, it establishes a low impedance, fast-rate charging current path between the rectifier diodes $D_1,D_2$ of the transformer charging circuit and the rechargeable battery B.

The conduction of the SCR is controlled by a non-latching switching control circuit comprising a bridge network N, an operational amplifier A and a switching transistor Q. As illustrated in FIG. 1, the bridge network N consists of resistors $R_5,R_6$ and thermistors $T_1,T_2$ configured to provide two parallel legs connected across the DC battery potential, each leg comprising a resistor connected in series with a thermistor. Thermistors $T_1,T_2$ have negative temperature coefficients; i.e., as temperature increases, their resistance decreases. Thermistor $T_2$ senses and develops a voltage corresponding to the battery temperature and thermistor $T_1$ senses and develops a voltage corresponding to the ambient temperature. The electrical/thermal characteristics of $T_1$ and $T_2$ would ideally be identical. Resistance $R_5$ is higher in value than resistance $R_6$. Accordingly, when the battery and ambient temperature are equal, the inverting input of operational amplifier A is higher in potential than the noninverting input, causing the output of the operational amplifier A to be low. The low output condition biases transistor Q in a non-conducting state. With transistor Q non-conducting, the control electrode of the SCR receives gate current via resistor $R_2$ causing the SCR to turn on with each positive half-wave pulse and conduct the charging current pulses from the full-wave rectifier circuit to the rechargeable battery.

Figure 2A:
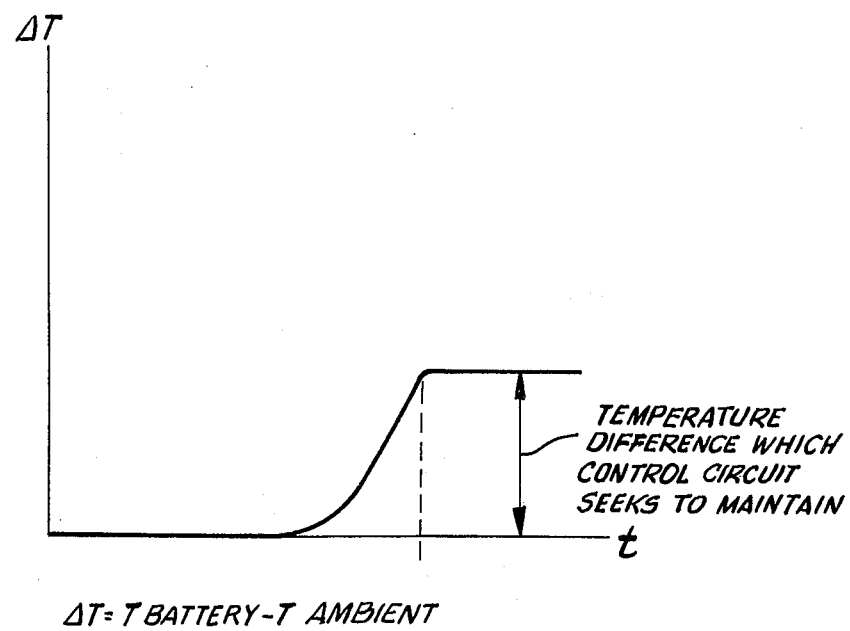
FIGS. 2($a$),($b$) illustrates the $\Delta T$ non-latching control approach implemented in the controlled fast charger.
Figure 2B:
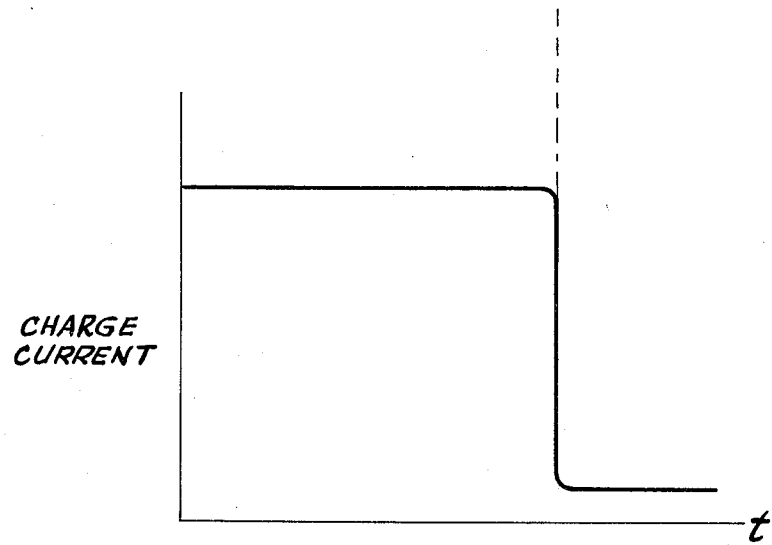

As already mentioned, when the SCR is conductive, there is a low impedance path from the rectifier to the battery. Thus, the SCR conducts fast-rate current pulses. The delivery of fast-rate charging current continues until the battery temperature exceeds the ambient temperature by a predetermined increment, as in FIGS. 2($a$),($b$) established by the relative values of resistors $R_5,R_6$ and the thermistor characteristics. At that point, the potential at the inverting input to the operational amplifier A goes low relative to the noninverting input, driving the output of operational amplifier A high. The high output condition biases transistor Q in a conducting state. When transistor Q is conducting, the control electrode of the SCR is at a much lower potential than the cathode. No gate current flows, and the SCR turns off to at least momentarily terminate the fast-rate charging current.

The SCR will turn on when the battery temperature has fallen very slightly below the threshold value for the temperature differential, and will turn off again when the temperature rises above this threshold value. In an ambient of constant temperature, the SCR will conduct periodically delivering an average current just sufficient to maintain the predetermined battery/ambient differential.

Characteristic on-off cycling of room heating and cooling systems in a habitation result in slight variations in the room ambient temperature about some mean value. The thermal time constant of batteries is typically much greater than that of the ambient temperature sensing thermistor. The result of a cycling ambient temperature is to cause the duration of the on and off times of the fast charge current to be longer. The extended periods of fast-rate overcharge current can be harmful to the battery. One solution is to provide a slow-rate charge path by means of optional resistor $R_1$ in shunt with the SCR. The slow-rate current can be made of such value that it alone will maintain the battery in overcharge at a temperature above ambient which is slightly greater than the control circuit attempts to maintain. An alternative solution to this problem is to add thermal mass to the ambient sensing thermistor to give it the same thermal time constant as the battery described in a copending patent application entitled, "Indicator of Full Charge for Secondary Cell or Battery Thereof" of Ferdinand H. Mullersman and Charles R. Blake, filed on Sept. 22, 1980, bearing Ser. No. 189,337 and assigned to the assignee of the present invention.

Selection of the components for a controlled fast charger incorporating the present invention will be appreciated from the following exemplary embodiment which supplies a controlled fast-rate charging current of 2 amperes to four series-connected nickel-cadmium AA cells having a nominal open circuit voltage of 1.25 volts each.

The following components were utilized to implement the circuit illustrated in FIG. 1 and achieve a $\Delta T$ of 10° C. Transformer T - Stancor P-8662 24 VCT/2A; rectifier diodes $D_1,D_2$ - General Electric type A14; resistor $R_2$ - 5.6K ohms; resistor $R_3$ - 1.8K ohms; resistor $R_4$ - 22K ohms; resistor $R_5$ - 3.9K ohms; resistor $R_6$ - 3.0K ohms; resistor $R_7$ - 2.5 ohms; thermistor $T_1$ - 1D201 (NTC 3K ohms); thermistor $T_2$ - 1D201 (NTC 3K ohms); SCR - General Electric type C104; A - CA3130; and Q - 2N5172. A resistor of value 29 ohms at $R_1$ was found to be capable of eliminating fast charge current pulses in overcharge in an air conditioned ambient with temperature varying cyclically as is normal for air conditioners. Biasing resistors $R_2$, $R_3$ and $R_4$ were selected in accordance with standard design techniques.

The $\Delta T$ control approach described above overcomes the indicated shortcomings of the conventional $\Delta TCO$ latching control approach. In particular, if a discharged battery having a temperature greater than the charger ambient by an amount exceeding the $\Delta T$ control level is connected to the charger, the charger will not deliver fast-rate charging current initially. However, when the battery temperature drops below the $\Delta T$ control level, the SCR will turn on and fast-rate charging current will be delivered until the battery temperature again exceeds the ambient temperature by the $\Delta T$ control differential. Because the fast-rate charging current is continuously responsive to the temperature differential $\Delta T$, there is no latching of the fast-rate charging current to an off condition. Thus, the $\Delta T$ control method is immune to electrical noise and requires no special operation such as pushing a reset button to initiate fast-rate charging operation.

Although the embodiment described above utilizes one technique for implementing the controlled fast-rate charger, certain modifications and variations thereof are possible. Thus, the above description of the preferred embodiment is exemplary and should not be considered as limiting the scope of the present invention.

What is claimed is:

1. Apparatus for supplying a controlled charging current to a sealed rechargeable cell comprising:
   (a) means connectable to an external electrical source for providing charging current;
   (b) controllable switching means connected in series between said charging current means and said rechargeable cell and being operable between a conducting state, wherein said charging current is supplied to said cell, and a non-conducting state wherein said charging current is interrupted;
   (c) thermal sensing means including first means in thermal proximity to said rechargeable cell for sensing the temperature of said rechargeable cell, and second means for sensing the ambient temperature; and
   (d) switching control means responsive to said thermal sensing means for maintaining said switching means in the conducting state, and thereby providing a path for the delivery of said charging current to said rechargeable cell, until the cell temperature exceeds the ambient temperature by a predetermined amount and thereafter maintaining that temperature difference.

2. Apparatus for supplying a controlled fast-rate charging current to a sealed rechargeable cell comprising:
   (a) means connectable to an external electrical source for providing fast-rate charging current;
   (b) controllable electronic switching means having a conducting state and a non-conducting state and including an input terminal, an output terminal and a control terminal, wherein said input terminal is connected to said charging current means and said output terminal is connected to said rechargeable cell;
   (c) temperature sensing means including first means in thermal proximity to said rechargeable cell for sensing the temperature of said rechargeable cell, and second means for sensing the ambient temperature; and
   (d) electronic switching control means responsive to said temperature sensing means and operatively connected to said control terminal for generating a switching control signal for maintaining said controllable electronic switching means in the conducting state, and thereby providing a path for the delivery of said fast-rate charging current to said rechargeable cell, until the cell temperature exceeds the ambient temperature by a predetermined amount and thereafter maintaining that temperature difference.

3. Apparatus for supplying a controlled fast-rate charging current to a sealed rechargeable cell comprising:
   (a) means connectable to an external electrical source for providing fast-rate charging current;
   (b) controllable electronic switching means having a conducting state and a non-conducting state and including an input terminal, an output terminal and a control terminal, wherein said input terminal is connected to said charging current means and said output terminal is connected to said rechargeable cell;
   (c) bridge network means connected in parallel across said rechargeable cell and including a first leg consisting of first temperature sensing means connected to first resistance means and a second leg consisting of second temperature sensing means connected to second resistance means, said bridge network means configured such that a voltage representative of the temperature of said rechargeable cell is developed across said first temperature sensing means and a voltage representative of the ambient temperature is developed across said second temperature sensing means;
   (d) operational amplifier means having an inverting input terminal, a noninverting input terminal and an output terminal, wherein said inverting input terminal is connected to said bridge network means to respond to he voltage developed across said first thermal sensing means and said noninverting input terminal is connected to said bridge network means to respond to the voltage developed across said second thermal sensing means; and
   (e) transistor switching means connected between the output terminal of said operational amplifier means and the control terminal of sid controllable electronic switching means for generating a control signal for maintaining said controllable electronic switching means in the conducting state, and thereby providing a fast-rate charging current path between said charging current means and said rechargeable cell, until the cell temperature exceeds the ambient temperature by a predetermined amount and thereafter maintaining that temperature difference.

4. Apparatus as recited in claim 3 wherein said controllable electronic switching means includes silicon controlled rectifier means, said first temperature sensing means includes first thermistor means; and said second temperature sensing means includes second thermistor means.

5. Apparatus as recited in cliam 4 wherein the resistance versus temperature characteristics of said first thermistor means are approximately equal to the resistance versus temperature characteristics of said second thermistor means; and the value of said first resistance means is less than the value of said second resistance means.

6. Apparatus for supplying a controlled fast-rate charging current to a sealed rechargeable cell comprising:
   (a) means connectable to an external electrical source for providing fast-rate charging current;
   (b) controllable electronic switching means having a conducting state and a non-conducting state and including an input terminal, an output terminal and a control terminal, wherein said input terminal is connected to said charging current means and said output terminal is connected to said rechargeable cell;
   (c) bridge network means connected in parallel across said rechargeable cell and including a first leg consisting of first temperature sensing means connected to first resistance means and a second leg consisting of second temperature sensing means connected to second resistance means, said bridge network means configured such that a voltage representative of the temperature of said rechargeable cell is developed across said first temperature sensing means and a voltage representative of the ambient temperature is developed across said second temperature sensing means;
   (d) operational amplifier means having an inverting input terminal, a noninverting input terminal and an output terminal, wherein said inverting input terminal is connected to said bridge network means to respond to the voltage developed across said first thermal sensing means and said noninverting input terminal is connected to said bridge network means to respond to the voltage developed across said second thermal sensing means;
   (e) transistor switching means connected between the output terminal of said operational amplifier means and the control terminal of said controllable electronic switching means for generating a control signal for maintaining said controllable electronic switching means in the conducting state, and thereby providing a fast-rate charging current path between said charging current means and said rechargeable cell, until the cell temperature exceeds the ambient temperature by a predetermined amount and thereafter maintaining that temperature difference; and
   (f) third resistance means connected between the input and output terminals of said controllable electronic switching means for providing a slow rate charging current path between said charging current means and said rechargeable cell when said controllable electronic switching means is in the non-conducting state.

7. Apparatus as recited in claim 6 wherein said controllable electronic switching means includes silicon controlled rectifier means; said first temperature sensing means includes first thermistor means; said second temperature sensing means includes second thermistor means, wherein the resistance versus temperature characteristics of said second thermistor means are approximately equal to the resistance versus temperature characteristics of said first thermistor means; and the value of said first resistance means is less than the value of said second resistance means.

* * * * *